March 3, 1970 R. J. CHEN 3,498,203

CAPILLARY APPLICATOR

Filed June 7, 1967 2 Sheets-Sheet 1

INVENTOR
Richard J. Chen
BY
Brown and Mikulka
and
Alfred E. Corrigan
ATTORNEYS

INVENTOR.
Richard J. Chen
BY
Brown and Mikulka
and
Alfred E. Corrigan
ATTORNEYS

United States Patent Office 3,498,203
Patented Mar. 3, 1970

3,498,203
CAPILLARY APPLICATOR

Richard J. Chen, Winchester, Mass., assignor to Polaroid Corporation, Cambridge, Mass., a corporation of Delaware Filed June 7, 1967, Ser. No. 644,152
Int. Cl. G03d 3/00
U.S. Cl. 95—89 24 Claims

ABSTRACT OF THE DISCLOSURE

A photographic processing apparatus consisting of two members movable between a first position in which cooperating faces on the members form a capillary channel and a second position in which the faces seal the channel, an elastically deformable element for connecting the two members together, and a mechanism for moving the members between their first and second positions. The two members have complementary surfaces which form a variable volume chamber therebetween that communicates with the capillary channel and has a device therein for receiving a supply of processing liquid and delivering it to the channel. The deformable element normally maintains the two members in their second position but also cooperates with the mechanism for moving the members to their first position. The volume of the chamber and the pressure of the liquid in the chamber are changed in an inverse manner in response to movement of the members between their first and second positions.

Photographic apparatus of the type comprehended by the present invention generally includes means for exposing successive areas of a light-sensitive, image-recording sheet to light from a subject, such as a document, page of a book, photograph, etc.; cutting the exposed image-recording sheet into sections each including an exposed area; and treating each of the sections with a liquid processing agent to form a visible (positive) image of the subject. The exposure system of the apparatus generally comprises means for supporting successive sections of the photosensitive sheet in position for exposure, means for locating a subject in position for exposure, means for illuminating the subject, and an optical system including an objective lens for producing an image of the subject on the section of the photosensitve sheet positioned for exposure. The processing system includes means for severing each exposed section of the photosensitive sheet from the remainder of the sheet and applying a liquid processing agent to the exposed area of each section to effect visible image formation.

An object of the present invention is to provide in photographic apparatus of the type described, novel and improved means for applying to an exposed photosensitive element a predetermined, uniformly distributed quantity of processing liquid.

Another object of the invention is to provide novel means, as described, having first and second members connected together by elastically deformable means for relative movement therebetween, said members having facing surfaces which define a capillary when said members are in a first position and said facing surfaces seal said capillary when said members are in a second position.

Another object of the present invention is to provide novel means as described wherein complementary surfaces of said members define a variable volume chamber for containing a fibrous material therein for receiving and delivering a supply of processing liquid to said capillary wherein the volume of said chamber decreases as said members are moved from said second position to said first position to expel liquid into said capillary.

Another object of the present invention is to provide novel means as described including means for deforming an elastically deformable means and said deformable means provides the force for returning said members to said second position when said means for deforming is removed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
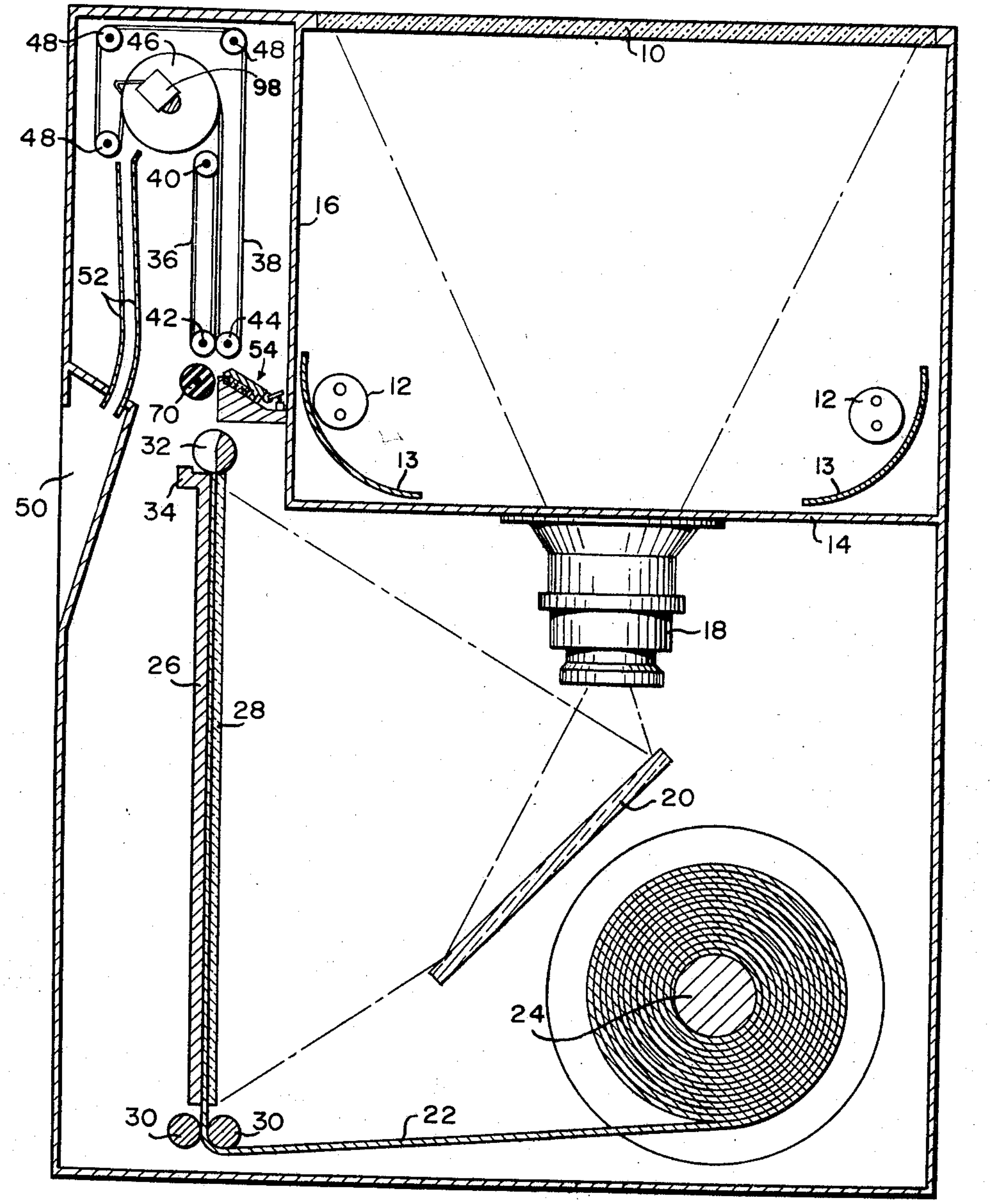
FIGURE 1 is a sectional, elevational view of photographic document-copying apparatus embodying the invention.

The liquid applicator of the invention is especially designed for incorporation in photographic apparatus in which light-sensitive, image-recording sheet material is exposed and processed to produce visible images. The apparatus may take the form of a camera, document duplication apparatus, a printer, or the like, for performing any of a variety of image-forming processes. For purposes of illustration, the invention is described and shown as incorporated in document-copying apparatus adapted to be employed with an integral image-recording and image-receiving sheet comprising a support such as paper, at least one layer containing a light-sensitive material such as a silver halide emulsion, and an outer layer comprising a translucent material such as finely divided titanium dioxide, dispersed in a suitable permeable colloidal carrier or matrix, such as gelatin, which is permeable to an aqueous processing liquid. The translucent pigment may be incorporated in a layer containing a light-sensitive material and/or may comprise a separate outer layer which may also contain silver precipitating nuclei and is sufficiently transparent to permit exposure of the light-sensitive layer therebeneath, while at the same time being sufficiently opaque to provide a requisite background for a positive silver image transfer thereto by diffusion and to mask a negative image formed thereunder. Processing of the exposed image-recording sheet is accomplished by applying an aqueous liquid including a silver halide developer and a silver halide complexing agent to the side of the sheet opposite the support so as to impregnate the light-sensitive layer with sufficient processing liquid to produce a positive silver transfer image on the surface of the translucent layer.

Combined image-recording and image-receiving sheet materials of the foregoing type and processes performed therewith are described in detail in copending U.S. application of Edwin H. Land, Ser. No. 519,995, now abandoned, and of U.S. application of Edwin H. Land et al., Ser. No. 519,884, both filed on Jan. 11, 1966. The aqueous alkaline liquid processing composition has approximately the viscosity of water and a typical composition useful in the method and apparatus of the invention for producing silver transfer images in an exposed area of an image-recording sheet of the type described comprises the following proportions of ingredients:

| | | |
|---|---|---|
| Water | cc | 8400.0 |
| Sodium sulfite | g | 675.0 |
| Sodium hydroxide | g | 180.0 |
| Potassium thiosulfate | g | 207.0 |
| 4-amino-2,6-dimethylphenol | g | 180.0 |
| Aqueous solution of sodium sulfide (0.0156 g. $Na_2S$/cc.) | cc | 9.0 |
| Aqueous solution of lead acetate and cadmium acetate (08.7 g. of lead actetate and 06.3 g. of cadmium acetate/300 cc.) | cc | 192.0 |

The liquid applicator of the invention is equally well adapted for applying nonviscous liquid reagents for performing other image-forming photographic processes involving one or more sheets. For example, a processing liquid may be applied to an image-recording sheet which is thereafter pressed into contact with a separate image-receiving sheet to produce a transfer image in the latter. Materials and processes of this type may be used to produce both black-and-white and color prints, and as an example of the latter, reference is made to U.S. Patent No. 2,983,606, issued May 9, 1961, to Howard G. Rogers, which describes the production of multicolor photographic transfer prints utilizing an integral, multilayer, image recording sheet incorporating dye developers. Liquid-processing compositions useful in processes of the last-mentioned type also comprise highly alkaline aqueous solutions subject to deterioration (e.g., oxidation) upon exposure to the atmosphere and requiring special handling and storage procedures because of their reactive and corrosive properties.

All of the foregoing photographic processes have several common requirements. These include:

(1) Rapid application of the liquid, e.g., high linear speeds;

(2) Application of an accurately predetermined quantity of the liquid;

(3) Uniform liquid application;

(4) Application of relatively small quantities of the liquid; and (5) Rapid initiation and termination of the flow of liquid from the capillary.

For example, in document duplication processes utilizing the hereinbefore described integral image-recording and image-receiving sheet, the sheet material may be moved relative to the applicator at the rate of ten inches per second to apply 1.5 cc. of the processing liquid to an area of the sheet measuring 8½ x 11 inches. In a color process of the type described, approximately 0.25 cc. of processing liquid is applied to an area of the sheet measuring about 3 x 4 inches and moved at the rate of nine inches per second. The foregoing examples thus provide a good indication of the preciseness with which the liquid must be applied and the problems that must be solved in order to produce high quality results in a dependable manner.

Reference is now made to FIGURE 1 of the drawings wherein there is illustrated document-copying apparatus embodying the invention. The document copier comprises means for exposing successive areas of a combined image-recording and image-receiving sheet, severing successive sections of the sheet, each containing an exposed area, from the remainder of the sheet and means for processing the successive sections of the sheet including means for applying a nonviscous (e.g., viscosity of water) liquid reagent to one side of each of the sections.

The apparatus comprises exposure means including a window 10 in the upper wall of the housing of the apparatus for supporting an original, e.g., document, in position for exposure to light from lamps 12 and reflector 13 mounted within an enclosed chamber separated from the remainder of the interior of the housing by a lower wall 14 and a side wall 16. Light reflected from an original positioned on window 10 is transmitted by a conventional objective lens, part of a lens and shutter assembly 18 toward a focal plane in the apparatus at which the lens forms an image of the original. The optical system includes, in addition to the lens of assembly 18, a mirror 20 positioned beneath the lens for reflecting light toward one side of the housing and means for supporting a light-sensitive, image-recording sheet at the focal plane of the lens.

A supply of light-sensitive, image-recording sheet material, designated 22, is provided coiled on a spool 24 in the lower portion of the apparatus behind mirror 20. The means for positioning successive sections of the sheet in position for exposure include a support plate 26 and a juxtaposed transparent plate 28 located in a vertical plane with the surface of the transparent plate located substantially at the focal plane of the lens. Sheet 22 is withdrawn from spool 24 and moved upwardly between plates 26 and 28 by a pair of juxtaposed feed rolls 30 located beneath and adjacent to the lower edges of the plates.

A rotary knife 32 and anvil 34 are mounted above and adjacent the upper edges of plates 26 and 28 for severing successive exposed sections of the image-recording sheet as each section is advanced upwardly from between the plates between the knife and anvil. In the operation of the apparatus, a section of the image-recording sheet positioned between plates 26 and 28 is advanced, following exposure, upwardly past the knife into engagement with liquid applicator means and then through a sheet conveyor system designed to deliver the sheets from the applicator to an exit opening in the housing of the apparatus and to provide a delivery period of sufficient duration to permit completion of the processing of the image-recording sheet within a dark environment. The sheet delivery system includes two sets of endless conveyor belts 36 and 38. The belts 36 are mounted on support rolls 40 and 42, and belts 38 extend from support rolls 44, juxtaposed with support roll 42, upwardly in juxtaposition with belts 36 and around an enlarged drum or discs 46 and thence back to support roll 44 by way of support rolls 48 spaced around the periphery of drum or discs 46. Appropriate means (not shown) are provided for rotating the various rolls and drum or discs 46. The conveyor belts 38 which contact the side of the sheets to which the liquid is applied are preferably quite narrow in order to limit the area of contact between the belts and the sheet, and in the preferred form, may comprise conventional O-rings.

The housing of the apparatus includes an opening 50 through which the processed sheets are delivered and a pair of guides 52 extending from the opening upwardly toward the points of tangency between belts 38 and discs 46 for guiding the sheets from between the belts and discs downwardly through opening 50.

Figure 2:
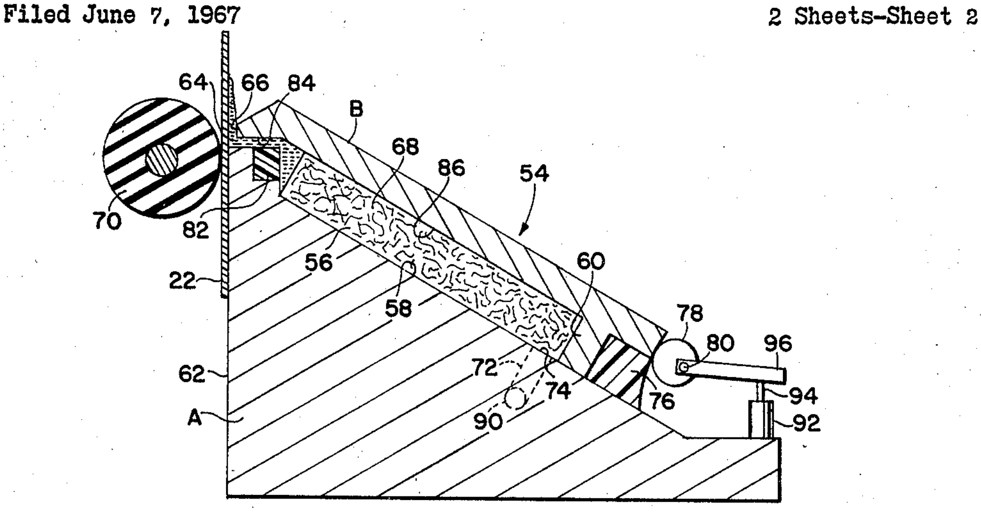
FIG. 2 is an enlarged sectional view of a liquid applicator constructed in accordance with the invention, said applicator being shown in a first position wherein a capillary is defined by adjacent surfaces.
Figure 3:
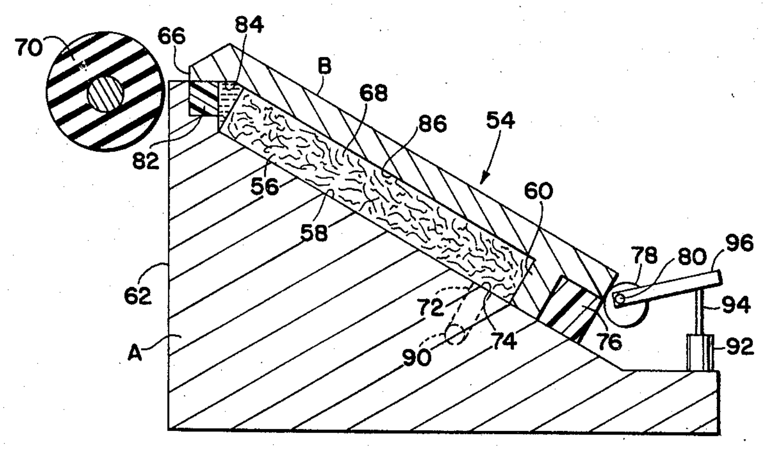
FIG. 3 is a view similar to FIG. 2 showing the applicator in a second position wherein the capillary is sealed.

The liquid applicator of the invention is designated 54 in FIGURE 1 and is shown in detail in FIGS. 2 and 3 as an elongated container comprising members A, B including a variable volume chamber 56 defined by complementary surfaces 58, 60, 86 for holding a quantity of processing liquid. The chamber 56 containing the processing liquid is approximately equal in length to the width of the area of the photosensitive sheet material to be treated. Applicator 54 includes a section providing a generally planar support surface 62 at least equal in length to the width of the sheet material to be treated for guiding and supporting the sheet material during application of the processing liquid. Support surface 62 terminates at one side of a capillary channel or slot 64 at least equal in length to the width of the area of the sheet material to be treated and having a depth of capillary dimensions such that an aqueous alkaline liquid having a viscosity substantially that of water will flow through channel 64 by capillary action. Applicator 54 includes a section on the opposite side of channel 64 from surface 62 providing a surface 66 set back from surface 62 by approximately the width of capillary channel 64.

The applicator including the portions thereof providing the chamber 56, surfaces 62 and 66 and capillary channel 64, may be formed of any material that is compatible with the processing liquid and preferably a material that is wet by the processing liquid in order to encourage flow thereof by capillary action. Suitable materials include organic polymers such as the acrylics, glass, ceramics and metals.

Processing liquid is conducted from a reservoir (not shown) in which it is contained, to capillary channel 64 by a multiplicity of capillaries and by conduits 90, 72 shown in dotted lines in FIGS. 2 and 3, conduit 72 having an opening 74 in member A. In the embodiment shown in FIGS. 2 and 3, this multiplicity of capillaries is provided by a fibrous wick 68 formed, for example, of a nonwoven fabric composed of fibers of a material such as polypropylene, which is compatible with the processing liquid. Wick 68 substantially fills chamber 56 which extends from the bottom of the applicator upwardly and at an angle to a position above the level of capillary channel 64. By virtue of this construction, processing liquid is raised within chamber 56 to a level above channel 64 and provides a supply head in the capillary channel. Suitable means (not shown) are provided for initiating and terminating flow of the liquid to chamber 56.

It has been discovered that a single capillary channel or slot provides the best means for accurately metering the quantity of the processing liquid applied to the sheet material and uniformly distributing processing liquid in contact with the sheet material. A multiplicity of capillaries for conducting the liquid from a reservoir to the metering and distributing capillary provides assurance of an adequate supply of the liquid to the capillary channel despite the clogging or plugging of a number of the supply capillaries. The invention comprehends a construction incorporating a sufficient number of supply capillaries for conducting at least twice the amount of liquid that can be carried by the metering and distributing capillary channel.

The processing liquid is applied to sheet 22 by moving the sheet upwardly against surface 62 across capillary channel 64 and surface 66 in a direction generally perpendicular to the length of the capillary channel. The liquid is conducted from chamber 56 to the capillary channel 64 by wick 68 and the capillary channel performs the function of uniformly distributing a metered amount of the liquid in contact with the sheet as the sheet is moved past the channel.

A backing roll 70 preferably having a surface with a high coefficient of friction, e.g., an elastomer such as polyurethane, is mounted with its surface tangent to surface 62 closely adjacent the edge of capillary channel 64. Means are provided for rotating roll 70 (in a counterclockwise direction) for supporting and moving a sheet against surface 62 across channel 64. In the operation of the document copier shown in FIGURE 1, sheet 22 is advanced upwardly past knife 32 between surface 62 and roll 70 and thence into engagement between belts 36 and 38 at rolls 42 and 44.

Rotation of all of the sheet-advancing rolls and belts is coordinated to insure movement of the sheet material at a constant predetermined speed particularly during processing, including liquid application and the subsequent processing period.

Following each liquid application operation, it may be desirable to seal capillary channel 64 to prevent evaporation of the liquid within the capillary channel. This is accomplished by moving members A and B relative to each other from the position shown in FIG. 2 to that shown in FIG. 3. Member B is attached to member A along three sides (only one of which is shown) of the applicator by an elastically deformable means 76, said means 76 being deformed by a force applying means, e.g., an eccentrically mounted cam 78 mounted for rotation on member 80. A portion 82 of one of the surfaces of member A defining capillary channel 64 is also constructed from an elastically deformable means, said portion 82 extending the full length of capillary channel 64. In FIG. 2 members A and B of the applicator are shown in a liquid-applying position wherein element B has been moved from the position shown in FIG. 3 wherein the capillary channel 64 is sealed by engagement of surface 84 with flexible portion 82. Movement of member B by cam 78 from the position shown in FIG. 3 to that shown in FIG. 2 results in deformation of elastically deformable means 76, as shown in FIG. 2. This movement positions surface 84 of member B such that a capillary channel 64 is defined. When the deforming force applied by cam 78 is removed, the elasticity of means 76 will return member B to the position shown in FIG. 3.

The means for rotating cam 78 may comprise manual means or any other suitable means as, for example, a solenoid 92 having an arm 94 operatively coupled with a lever 96. Lever 96 is connected with member 80 for rotation of member 80 in response to actuation of solenoid 92. Solenoid 92 is actuated by a relay operated by a timer (not shown). A more detailed explanation will appear hereinafter.

At this point it should be noted that the volume of chamber 56 decreases as members A and B are moved relative to each other from the position shown in FIG. 3 to that shown in FIG. 2. This is due to wall 60 moving to the left, as viewed in FIG. 2, as force is directed against member B by cam 78. Decreasing the volume of chamber 56 as the capillary channel 64 is opening results in the expulsion of liquid into capillary channel 64 for immediate application. Note also that the volume of chamber 56 increases as members A and B are moved from the position shown in FIG. 2 to that shown in FIG. 3 with the resulting immediate withdrawal of liquid from capillary channel 64 as the capillary channel is closed. Removing the liquid from the channel insures that substantially no residue will be left to clog the capillary and no contamination problem is presented due to the adverse effects of the atmosphere on the highly alkaline processing liquid.

Fine adjustment of the height of capillary channel 64 is possible due to the angular relationship between the plane of movement of member B and a plane parallel with surface 84. In the instant invention movement of member B along its plane of movement will increase or decrease the height of capillary channel 64 by only approximately half as much, i.e., the ratio is approximately 2:1.

In the operation of the apparatus a subject, e.g., a document, is positioned on window 10 and a starter button is pressed to light lamps 12 and actuate the shutter assembly 18. A timer mechanism allows rollers 30 to be activated to feed the exposed section of sheet 22 past the rotary knife 32 and then between roll 70 and surface 62 of the applicator. The timer mechanism then actuates solenoid 92 for moving members A and B to a position wherein they define a capillary channel 64 for applying the liquid to the exposed section. Solenoid 92 is actuated just as the exposed section of sheet 22 reaches capillary channel 64. Next, the sheet is moved between rolls 42, 44, belts 36, 38 and around drum or discs 46 until the leading edge of the exposed section trips switch means 98. Tripping switch means 98 causes actuation of rotary knife 32 and stops the rotation of rolls 30. After a predetermined period of time, the timer (not shown) deactivates solenoid 92 thereby allowing the elasticity of deformable means 76 to move member B to seal the capillary. The exposed section of sheet 22 continues its travel around drum 46, between guide members 52 and through opening 50.

While the applicator has been shown and described as being oriented in a particular position during liquid application operation, liquid feeding is accomplished by capillary action rather than by flow of the liquid due to hydrostatic pressure thereby enabling the applicator shown to function in postions other than shown and described. The only limitation on orientation of the applicator is that the ends of the capillaries in the chamber be immersed in the processing liquid. This construction would permit the applicator to be employed in appartus such as a camera which is held and operated by hand and may be oriented in any number of positions during liquid application operations.

In accordance with the enumerated objects of the invention, the applicant has described apparatus for applying accurately predetermined quantities of a nonviscous liquid photographic processing reagent, uniformly to successive areas of photographic sheet material. The liquid applicator is suitable for incorporation in a variety of types of photographic apparatus for performing a variety of processes and its operation is dependable while being independent of such variable factors as hydrostatic pressure of the reservoir of liquid, atmospheric pressure and orientation of the applicator during use.

Since certain changes may be made in the above apparatus without departing from the scope of the invention herein involved, it is intendede that all matter contained in the above description or shown in the accompanying drawings shall be interpreted as illustrative and not in a limiting sense.

What is claimed is:

1. Photographic processing apparatus for applying to an exposed photosensitive element a predetermined, uniformly distributed quantity of processing liquid, said apparatus comprising, in combination:

first and second members;

means connecting said members for relative movement between first and second position, said members having facing surfaces spaced to form a capillary channel in said first position and in contact with each other to seal said capillary channel in said second position, said members further having complementary surfaces defining a chamber therebetween in communication with said capillary channel;

means within said chamber for receiving a supply of processing liquid and delivering said liquid to said capillary channel; and means for moving said members relative to one another between said second and first positions to change the volume of said chamber and the pressure on said liquid in said chamber in an inverse manner.

2. Photographic apparatus as defined in claim 1, wherein the volume of said chamber decreases as said members are moved relative to one another from said second position to said first position, said decrease in volume increasing the pressure on said liquid to expel said liquid into said capillary channel.

3. Photographic apparatus of claim 1, wherein said facing surfaces are parallel with each other and a first plane, one of said members being movable relative to the other of said members in a second plane, said planes making an angle with each other.

4. Photographic apparatus as defined in claim 1, wherein said connecting means comprise elastically deformable means secured to said members.

5. Photographic apparatus as defined in claim 4, wherein said elastically deformable means seals at least two sides of said chamber.

6. Photographic apparatus as defined in claim 1, wherein a portion of one of said facing surfaces defining said capillary channel comprises an elastically deformable means for coacting with the other adjacent surface for forming a seal when said members are in said second position.

7. Photographic apparatus as defined in claim 1, wherein said means within said chamber comprise a fibrous material.

8. Photographic apparatus as defined in claim 1, wherein said means within said chamber comprise a plurality of capillaries.

9. Photographic apparatus as defined in claim 8, wherein said plurality of capillaries are formed of a fibrous material.

10. Photographic processing apparatus for applying to an exposed photosensitive element a predetermined, uniformly distributed quantity of processing liquid, said apparatus comprising, in combination:

first and second members;

elastically deformable means connecting said members for relative movement therebetween, said members being movable between a first position and a second position, said members having facing surfaces spaced to form a capillary channel in said first position and in contact with each other to seal said capillary channel in said second position, said members further having complementary surfaces defining a variable volume chamber therebetween in communication with said capillary channel;

means within said chamber for receiving a supply of processing liquid and delivering said liquid to said capillary channel; and means for moving said members relative to one another between said second and first positions for decreasing the volume of said chamber and increasing the pressure on said liquid in said chamber to expel said liquid into said capillary channel.

11. Photographic apparatus as defined in claim 10, wherein said elastically deformable means seals at least two sides of said chamber.

12. Photographic apparatus as defined in claim 10, wherein said means within said chambers comprise a fibrous material.

13. Photographic apparatus as defined in claim 10, wherein said means within said chambers comprise a plurality of capillaries.

14. Photographic apparatus as defined in claim 13, wherein said plurality of capillaries are formed of a fibrous material.

15. A liquid applicator for applying a predetermined, uniformly distributed quantity of liquid comprising, in combination:

first and second members;

connecting means movably mounting said members relative to each other between a first position and a second position, said members having facing surfaces spaced to form a capillary channel in said first position and in contact with each other to seal said capillary channel in said second position, cooperating surfaces of said members defining a chamber for a liquid, said chamber being in communication with said capillary channel;

means within said chamber for receiving said liquid and delivering said liquid to said capillary channel; and means for moving said members relative to each other between sad second and first positions to change the volume of said chamber and the pressure on said liquid in said chamber in an inverse manner.

16. The liquid applicator as defined in claim 15, wherein said connecting means comprise elastically deformable means secured to said members.

17. The liquid applicator as defined in claim 16, wherein said elastically deformable means seals at least two sides of said chamber.

18. The liquid applicator as defined in claim 15, wherein said means within said chamber comprise a fibrous material.

19. The liquid applicator as defined in claim 15, wherein said means within said chamber comprise a plurality of capillaries.

20. The liquid applicator as defined in claim 19, wherein said plurality of capillaries are formed of a fibrous material.

21. A liquid applicator as defined in claim 15 wherein the volume of said chamber increases and the pressure of said liquid in said chamber decreases as said sections are moved from said first position to said second position, said decrease in pressure removing liquid from said capillary channel.

22. Photographic processing apparatus for applying to an exposed photosensitive element a predetermined, uniformly distributed quantity of processing liquid, said apparatus comprising, in combination:

first and second members;

elastically deformable means for connecting said members for relative movement between first and second positions, said members having facing surfaces spaced to form a capillary channel in said first position and in contact with each other to seal said capillary channel in said second position, said members further having complementary surfaces defining a chamber therebetween in communication with said capillary channel;

means within said chamber for receiving a supply of processing liquid and delivering said liquid to said capillary channel; and force applying means for applying a force to said apparatus to deform said elastically deformable means and to move said members from said second position to said first position, said elastically deformable means returning said members to said second position when said force is removed from said apparatus.

23. Photographic processing apparatus for applying to an exposed photosensitive element a predetermined, uniformly distributed quantity of processing liquid, said apparatus comprising, in combination:

first and second members;

elastically deformable means connecting said members for relative movement therebetween, said members being movable between a first position and a second position, said members having facing surfaces spaced to form a capillary channel in said first position and in contact with each other to seal said capillary channel in said second position, said members further having complementary surfaces defining a variable volume chamber therebetween in communication with said capillary channel;

means within said chamber for receiving a supply of processing liquid and delivering said liquid to said capillary channel; and force applying means for applying a force to said apparatus to deform said elastically deformable means and move said members from said second position to said first position, said elastically deformable means returning said members to said second position when said force is removed from said apparatus.

24. A liquid applicator for applying a predetermined, uniformly distributed quantity of liquid comprising, in combination:

first and second members;

elastically deformable means connecting said members to each other for movement between a first position and a second position, said members having facing surfaces spaced to form a capillary channel in said first position and in contact with each other to seal said capillary channel in said second position, cooperating surfaces of said members defining a chamber for a liquid, said chamber being in communication with said capillary channel, said elastically deformable means sealing at least two sides of said chamber;

means within said chamber for receiving said liquid and delivering said liquid to said capillary channel; and force applying means for applying a force to said apparatus to deform said elastically deformable means and move said members from said second position to said first position, said elastically deformable means returning said members to said second position when said force is removed from said apparatus.

References Cited

UNITED STATES PATENTS

| | | | |
|---|---|---|---|
| 2,594,486 | 4/1952 | Olden | 118—401 |
| 3,162,544 | 12/1964 | Cobert | 118—401 XR |
| 3,196,830 | 7/1965 | Lehovec | 118—401 |
| 3,201,275 | 8/1965 | Herrick | 118—401 XR |
| 3,348,526 | 10/1967 | Neubauer | 118—410 |

NORTON ANSHER, Pimary Examiner

FRED L. BRAUN, Assistant Examiner

U.S. Cl. X.R.

118—410, 413; 222—95